United States Patent [19]

Connin

[11] 4,099,150

[45] Jul. 4, 1978

[54] APPARATUS FOR PRODUCING DUPLEX COLLATED COPIES

[75] Inventor: John Lyman Connin, Canandaigua, N.Y.

[73] Assignee: Eastman Kodak Company, Rochester, N.Y.

[21] Appl. No.: 691,937

[22] Filed: Jun. 1, 1976

[51] Int. Cl.2 .................... G03G 15/00; G03B 27/32; G03B 27/46; B65H 5/26

[52] U.S. Cl. .................................... 355/3 R; 355/23; 355/26; 271/3.1; 271/9

[58] Field of Search .................................... 355/23-26, 355/75, 47-51, 3 R, 14; 271/3, 3.1, 4, 9, 65, 186

[56] References Cited

U.S. PATENT DOCUMENTS

| | | | |
|---|---|---|---|
| 3,556,512 | 1/1971 | Fackler | 271/4 |
| 3,630,607 | 12/1971 | Korn et al. | 355/6 |
| 3,645,615 | 2/1972 | Spear | 355/3 |

*Primary Examiner*—L. T. Hix
*Assistant Examiner*—W. J. Brady
*Attorney, Agent, or Firm*—G. Herman Childress

[57] ABSTRACT

A convenience copier having duplex capabilities includes a collating feeder that inverts the document automatically for copying both sides thereof. The copier includes a processing section for establishing visible representations of the document, feeding sections for presenting document and copy sheets to the processing section on a one-document-sheet one-copy-sheet basis, and inverting means for presenting both sides of the document sheets for copying and both sides of the copy sheets for receiving the visible representations. The document feeding section circulates and recirculates the document sheets from a supply to an exposure position and back to the supply, and inverts the document sheets during such circulation and recirculation in a manner suitable for making collated copies without disturbing the sequence of the document.

14 Claims, 9 Drawing Figures

FIG. 2
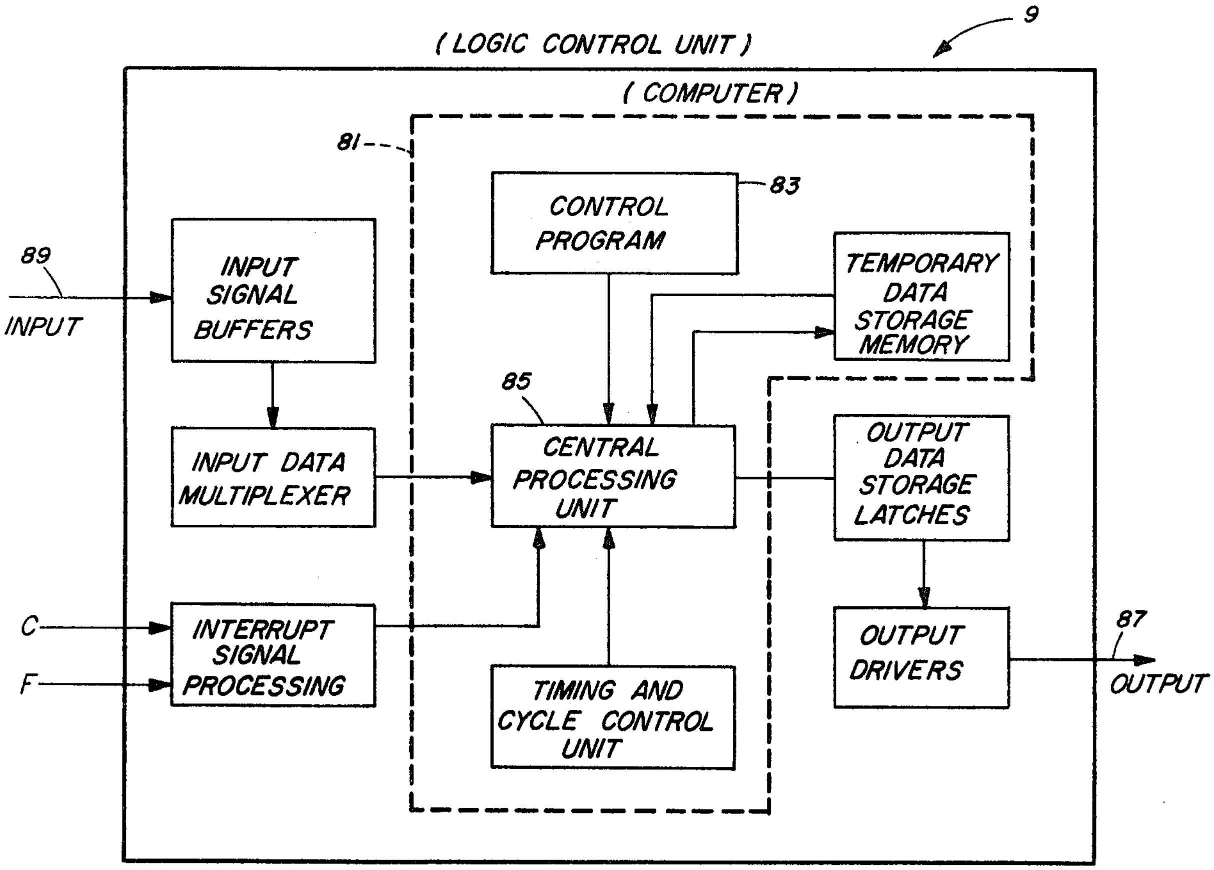
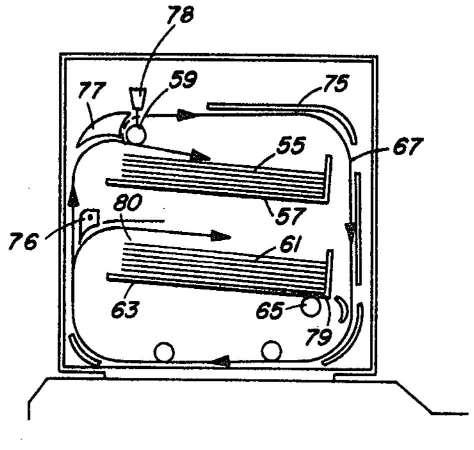
FIG. 3

APPARATUS FOR PRODUCING DUPLEX COLLATED COPIES

CROSS REFERENCES TO RELATED APPLICATIONS

Reference is made to U.S. Application Ser. No. 523,610, now abandoned, entitled *RECIRCULATING SHEET FEEDER*, filed in the name of M. J. Russel on Nov. 13, 1974 and refiled as U.S. Application Ser. No. 647,683 on Jan. 8, 1976; and to U.S. Pat. application Ser. No. 691,938, now abandoned, entitled *APPARATUS FOR PRODUCING COLLATED COPIES FROM TWO SIDED ORIGINALS* filed on even date herewith in the name of G. Gustafson.

BACKGROUND OF THE INVENTION

1. Field of the Invention

The present invention relates to convenience copiers and document feeders. More specifically, the invention relates to such copiers having duplex capabilities and to collating document feeders than invert the document automatically for producing duplex collated copies without a sorter.

2. Brief Description of the Prior Art

It is well known in the prior art to provide convenience copiers with duplex capabilities, with document feeders that circulate the document in a manner suitable for producing collated copies, or with document inverters that present both sides of the document for copying. Examples include: 1) in relation to the first feature — U.S. Pat. Nos. 3,318,212; 3,536,398; 3,615,129; 3,630,607; 3,645,615, 3,671,118; 3,672,765; 3,687,541; 3,697,171; 3,775,102; 3,844,653; 3,856,295; 3,862,802; 3,866,904; 3,869,202; 2) in relation to the second feature — U.S. Pat. Nos. RE 27,976; 3,552,739; 3,556,511; 3,709,595; 3) and, in relation to the third feature — U.S. Pat. Nos. 3,227,444; 3,416,791 and 3,675,999.

It also is known in the prior art to combine certain of the above mentioned features in a unified structure or control. U.S. Pat. No. 3,630,607 is notable for its disclosure of a collating feeder on a convenience copier having duplex capabilities. U.S. Pat. No. 3,844,653 discloses a convenience copier having duplex capabilities with a document inverting mechanism. U.S. Patent No. 3,862,802 discloses a duplex copier with a document inverting mechanism, and is said to be useable with a sorter to produce collated copies. "Research Disclosure" Vol. 133, No. 13329, May 1975, describes a manual approach for producing collated duplex copies without a sorter.

It is clear from such disclosures that numerous rather sophisticated features have been developed for modern copiers to supplement their basic copying function. This is not surprising when the economics of the total copying operation are considered. What is surprising is that, in spite of a clear-cut need, no one has succeeded in developing a fully automatic duplex copier that is capable of handling two-sided originals and also is conducive to finishing operations, such as collating, stapling and off-set stacking, or is not burdened by a sorter. Typically, prior art structures that approach such capabilities will not handle two sided originals on a fully automatic basis, or have required a cumbersome and expensive sorter than still leaves the stapling and off-set stacking to manual or very complex automatic operations.

SUMMARY OF THE INVENTION

In accordance with the present invention, a convenience copier is provided with the capability to produce collated duplex copies from duplex originals on a fully automatic basis, without a sorter, and in a manner convenient for on-line finishing.

According to one aspect of the invention, a convenience copier includes an image-processing section for establishing visible representations of the original, feeding sections for presenting original and copy sheets to the processing section on a one-original-sheet, one-copy-sheet basis, and inverting means to present both sides of the original sheets for copying and both sides of the copy sheets for receiving the visible representations.

According to another aspect of the invention, a collating document feeder is provided for sequentially presenting the sheets of a multi-page document to a convenience copier. The feeder includes means for circulating and recirculating document sheets seriatim; removing the sheets one-after-another from a supply, presenting the removed sheets for copying, and returning the copied sheet to the supply. During their circulation and recirculation, the document sheets are inverted, in correspondence with the feeding of the copy sheets, to present both faces of the sheets for copying, and to produce collated duplex copies in page-wise correspondence with the original.

In accordance with another aspect of the invention, the original and copy sheets are circulated twice for each copy, first on one face and then on the opposite face.

Still other aspects and more specific features will become apparent to those skilled in the art from the following description with reference to the drawings.

BRIEF DESCRIPTION OF THE DRAWINGS

In the detailed description of the preferred embodiment of the invention presented below, reference is made to the accompanying drawings, in which:

FIG. 2 is a schematic view depicting generally the logic and control unit of the copier represented in FIG. 1;

FIG. 3 is a slightly more detailed schematic illustration of the feeder depicted in FIG. 1.

DESCRIPTION OF THE PREFERRED EMBODIMENT

Figure 1:
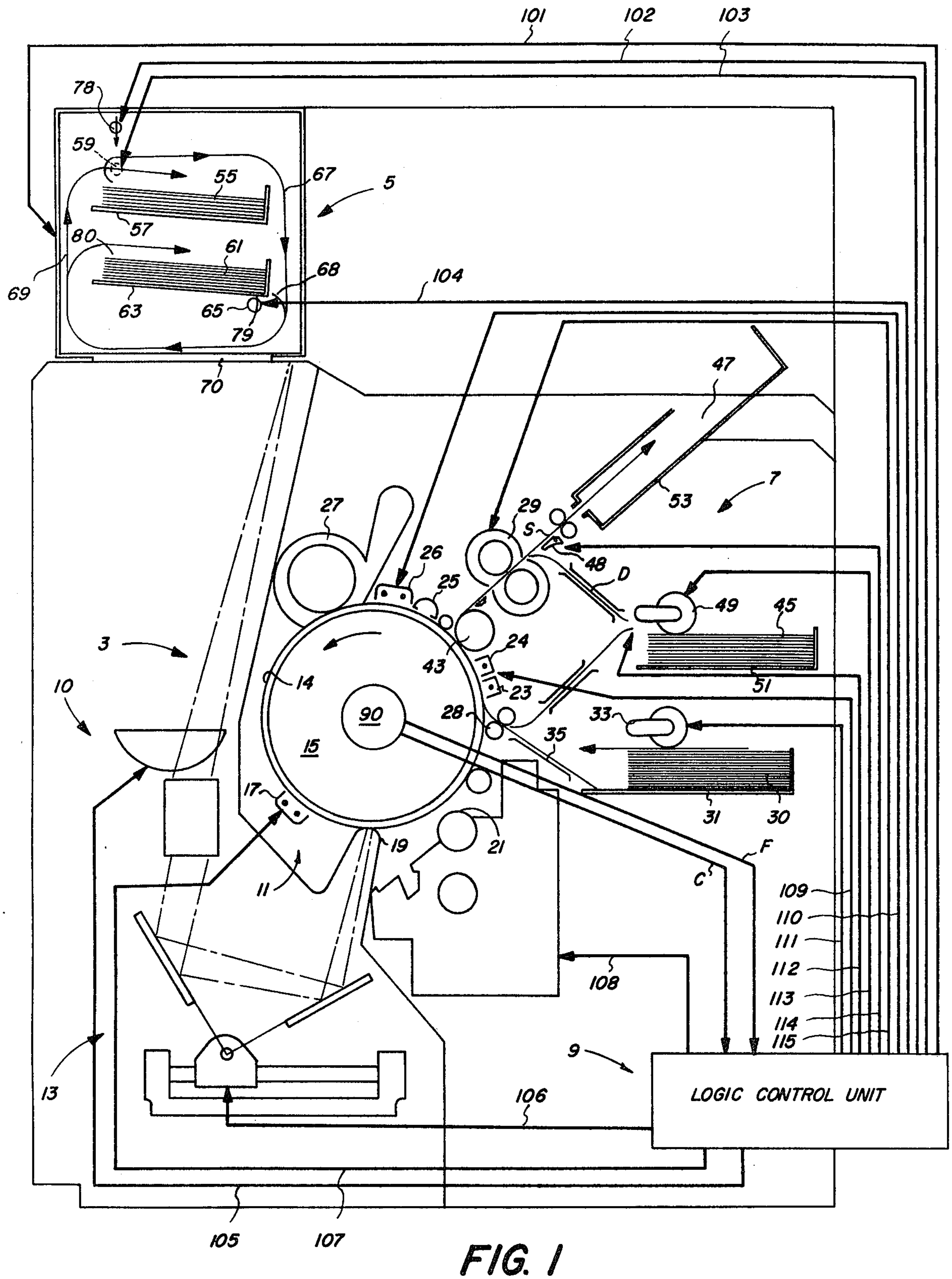
FIG. 1 is a schematic representation of a convenience copier having duplex capabilities and including a collated inverting document feeder in accordance with the present invention.

Referring now to the drawings, and especially to FIG. 1, a convenience copier is depicted in accordance with a preferred embodiment of the present invention, comprising a process section 3, feeding sections 5 and 7, and a logic control unit 9. The process section 3 includes an imaging device or projector 10 and a processor 11 for establishing visible representations of originals, typically as image-wise distributions of marking particles. The feeding sections present the original and copy sheets to the process section for establishing visible repesentations of the original sheets and for transferring those representations to the copy sheets.

The term "original" as used in the present application refers to the object to be copied, including documents and masters in cut or sheet form and comprising one or more sheets or pages. A "sheet", "support" or "supporting medium" of the original is used in reference to a single expanse of relatively thin, essentially flat material, such as paper, microfilm or a transparency, having two opposed faces or sides. A "page" of an original is a face or side of one sheet having an image, marking or information to be copied. A single sheet of an original may include one or two pages depending on whether one or both faces include material to be copied. A "simplex" original includes one page per sheet, a "duplex" original, two. Reference to sides or pages by numbers or as "odd" or "even", refers to a sequential numbering of the sides or pages in order from what conventionally is considered the beginning of the original to its end, and does not depend on how the pages are actually numbered. Two sheets of a simplex original would have pages 1 and 2 on separate sheets. In a duplex original pages 1 and 2 would be on opposite sides of the same sheet.

The term "copy" refers to duplicates of the original in the usual sense, including receivers or supporting mediums and having sheets, faces or sides, and pages as those terms are defined above. A "collated" copy is one that has its pages in the same sequential order as the original, but not necessarily the same page arrangement. A simplex original can be duplex in its copy, and still be collated.

The process section 3 can be selected from numerous suitable designs known to those skilled in the art. A scan/drum arrangement is depicted in which the imaging device includes scanning optical and illumination mechanisms 13 while the processor includes a photoconductor 14 supported on a drum 15 for movement in a cylindrical or closed path.

As the photoconductor moves in its path, it is acted upon by various processing stations. Proceeding counterclockwise, in the direction of drum rotation, the photoconductor is sensitized by a corona charger at station 17, is exposed by the imaging device at station 19, is developed by a magnetic brush at station 21, moves through corona transfer and detack stations 23 and 24, is erased by illuminators and corona chargers at station 25 and 26 and is cleaned by a vacuum brush at station 27. Two additional processing stations 28 and 29 are spaced from the photoconductor in a copy support path. These stations include a registration device and fuser, respectively.

In operation, the imaging device 10 sequentially scans the images from successive original sheets onto successive frames of the photoconductor, where visible representations of the original sheets are established and successively transferred to copy supports.

A further description of the above-mentioned stations, and the imaging device is presented in commonly assigned copending U.S. Patent Application Ser. No. 629,190, entitled OPTICAL SCANNING APPARATUS FOR COPYING MACHINES, filed in the names of A. Zanolli and C. Hage on Nov. 5, 1975, now abandoned the disclosure of which hereby is incorporated by reference into the present application.

Another arrangement that could be modified in accordance with the teachings of the present application to practice the invention, is disclosed in U.S. Pat. Nos. 3,914,047 entitled *SYNCHRONIZING CONTROL APPARATUS FOR ELECTROPHOTOGRAPHIC APPARATUS UTILIZING DIGITAL COMPUTER,* issued on Oct. 21, 1975 in the name of William E. Hunt et al; and 3,876,106 entitled *TONER CONCENTRATION MONITORING APPARATUS UTILIZING PROGRAMMABLE DIGITAL COMPUTER,* issued on Apr. 8, 1975 in the name of Stephen R. Powell, et al. This last mentioned arrangement is exemplary of the flash-web type.

The copy feeding section 7, is adapted to present copy supports, such as paper, to the process section for receiving the visible representations on one or both faces of the support. For this purpose, three hoppers are provided with interconnecting paths and with transport devices suitable for propelling the supports between the hoppers. The first or primary supply hopper 30 comprises a supply tray 31 for receiving a plurality of the supports and a feeder 33 selectively rotatable in engagement with the upper-most support to eject it from the stack and toward the transfer station of the process section. From the hopper, movement of the support is directed by guides, such as 35, and is controlled by the registration station 28, which directs the support toward the photoconductor at the proper speed and in synchronism to intercept an appropriate visible representation on the photoconductor. After transfer, the detaching corona at station 24 releases the support from the photoconductor and a vacuum roller 43 removes, inverts and redirects the support toward the fusing station 29 where the transferred image is fixed to the support. The copy support is then directed either to an intermediate hopper 45 or to an exit hopper 47, depending on whether a duplex or a simplex copy is to be generated. Assuming a duplex copy, the copy support exiting from the fixing station, and having an image received on one face thereof, is directed by diverter 48 along path "D", under a feed roller 49, and into a tray 51 of the intermediate hopper, for storage until the first sides of all of the document sheets have been copied. Then the supports in tray 51 are engaged by roller 49 and fed again to the process station to receive another visible representation on the other face in a manner essentially the same as that described above in connection with the first face. In the case of a simplex copy, on the other hand, or on the second pass of a duplex copy, the support is directed from the fuser along path "S" and into the tray 53 of the exit hopper. In this last hopper the final copies are accessible for retrieval by the operator. It will be noted that the copies are delivered faceup, last sheet first, for the convenience of the operator.

By way of recapitulation, in a duplex mode of operation, copy support sheets are removed sequentially from the top of a first stack in supply hopper 30, are fed one-after-another to receive an image or visible representation on one face, and then are inverted and deposited temporarily, each sheet on top of the preceeding sheets, to form an intermediate stack in hopper 45. After all of the first faces receive images, the copy support sheets are removed sequentially from the top of the intermediate stack, are fed one-after-another to receive an image or visible representation on the other face, and then are inverted and deposited in the exit hopper, each sheet on top of the preceeding sheets.

The document feeding section 5 circulates and recirculates the original sheets for presentation to the imaging device of the processing section, first on one face and then the other, in a manner suitable for collating the final copies of a multi-page document.

Figure 4:
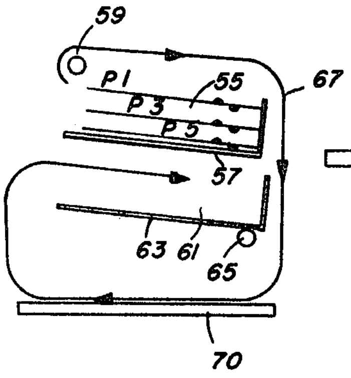
FIGS. 4–9 are schematic views depicting operational modes of the copier and feeder in accordance with the present invention, as described more fully in the description of the preferred embodiment that follows.
Figure 5:
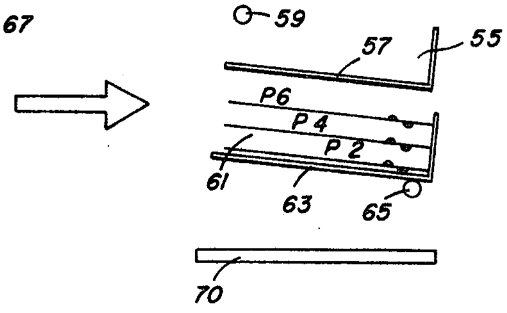
Figure 6:
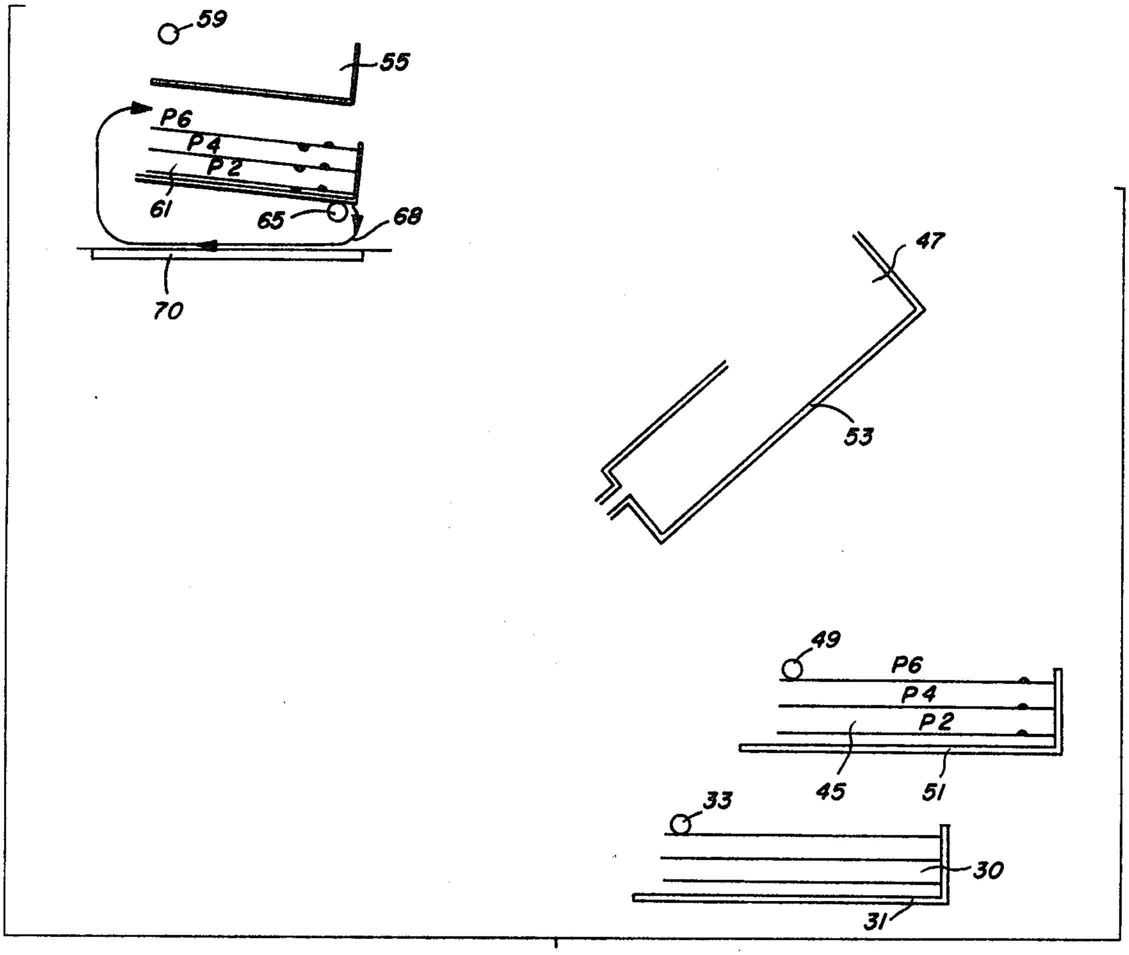

Using a duplex six-page original as an example, and referring now to FIGS. 4–6, which should be considered in conjunction with FIG. 1, the original is deposited face-up (i.e. pages P1, P3 and P5 facing upwardly with P1 on top) in a first supply or loading hopper 55, which includes a supporting tray 57 and a vacuum feeding roller 59. From the first tray, and before any copies are generated, the sheets of the original are fed seriatim from the top of the stack in the first supply to a second or feeding hopper 61, again including a supporting tray 63 and a vacuum feeding roller 65. In moving from the first to the second hopper, transport path 67 is utilized to invert the sheets or turn them over so that the document will be upside down (i.e. pages P1, P3 and P5 facing downwardly with P1 on the bottom) in the feeding hopper, page 1 on the bottom (see FIG. 5).

From the second hopper, the sheets of the original are fed seriatim along U-shaped path 68 for copying, as depicted in FIG. 6. The first sheet (pages 1 and 2) is removed from the bottom of the stack at one side, inverted or turned over and registered on an exposure platen 70 for copying (page P2 down). After a single exposure, the first sheet is removed from the platen, inverted again, and returned to the top of the stack in the second hopper, which it enters on the opposite side from which it was removed. This process is continued, one-sheet-after-another, and one exposure for each circulation or recirculation from the bottom to the top of the stack, until the entire original has been exposed the requisite number of times to make the desired number of copies.

With each exposure of an original sheet on the platen, a latent image is created in the photoconductor via the imaging device, and that latent image is developed at station 21 and transferred to the copy suports at station 23. By feeding a copy support at an appropriate time in correspondence with each exposure, and by directing that support from the transfer station along path "D" to the intermediate hopper 45, the copies will be generated and stored as depicted in FIG. 6, with images representing pages P2, P4, and P6 facing up, P2 on the bottom. Only one copy is depicted, but the others would appear in a similar manner on top of the first.

Figure 7:
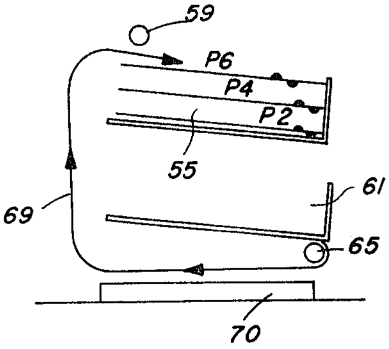
Figure 8:
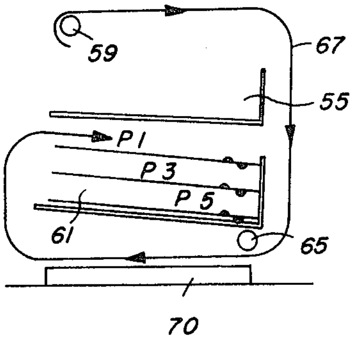

After the first faces of the original sheets have been copied, the original is prepared by stacking and refeeding, as depicted in FIGS. 7 and 8, for copying the second faces of the same sheets (pages P1, P3 and P5 in this example). The original is inverted by feeding the original sheets seriatim from the second hopper to the first hopper along path 69, see FIG. 7, and then from the first hopper back to the second hopper along previously mentioned path 67, see FIG. 8. Suitable guides and diverters 75, 76 and 77 (see FIG. 3) can be used to guide the sheets in their appropriate paths, and a solenoid 78 (FIG. 3) can lift the feed roller 59 from interfering with path 69.

Figure 9:
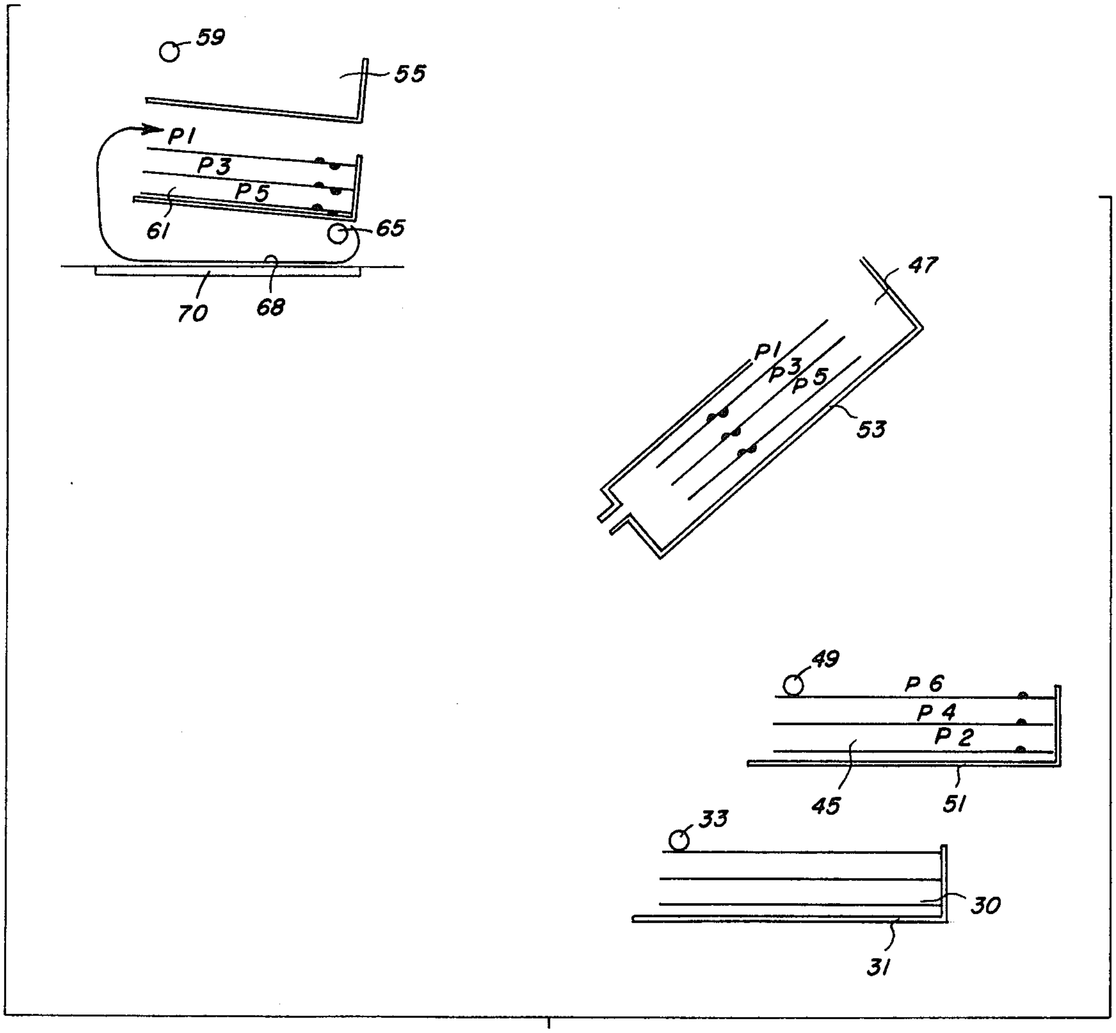

Returning to FIG. 9, the second faces of the original sheets are presented for copying in the same manner as the first. The sheets are circulated and recirculated seriatim from the bottom of the stack to the top of the stack along path 68, and are exposed once for each circulation or recirculation. As the original pages P5, P3, and P1 are presented and copied, the corresponding copy supports, already having pages P6, P4 and P2 on one face thereof, will receive images of pages P5, P3 and P1, respectively, on their opposite face, and will be delivered face-up to the exit hopper in collated order.

The final step contemplated in this example would be to feed the original sheets back along path 69 to the first hopper for retrieval by the operator. This step has not been illustrated.

Reviewing the operation of the document feeder, the original sheets are circulated one-after-another from a bottom exit 79 at one side of the second hopper to the exposure platen and back to a top entrance 80 at the other side of the second hopper. Each sheet is circulated once for each exposure, and the page-wise sequence of the original is maintained with each circulation. After one face (the even pages) of the original sheets have been copied, the sheets are inverted by their sequential feeding from the bottom side of the second hopper to the top opposite side of the first hopper and then from the top of the first hopper to the top of the second hopper. This procedure inverts the multi-page original document and thereby prepares the sheets for copying their other faces (the odd pages). Thus, the original sheets are circulated to the platen twice for the first copy and twice for each respective additional copy. The even pages are copied during the first circulation and the odd pages during the second.

A logic and control unit for accomplishing the above mode of operation is depicted in FIGS. 1 and 2. Its function generally is to coordinate the activities of the process section and the feeding sections. The logic and control unit could be implemented by numerous suitable mechanisms such as relays, transistors, or small and medium scale digital integrated circuits. In this particular embodiment, a microcomputer 81 (FIG. 2) is utilized. In this form, the combinational and sequential logic requirements of the process are embedded in a control program 83. The central processing unit 85 acts upon instructions from the central program 83 and controls the states of output signals 87 based upon the status of input signals 89, and image-frame timing signals C and F (FIG. 1). The C and F timing signals can be derived from an incremental encoder 90 connected to the drive means for the photoconductor drum, and provide information required to relate the position of the moving photoconductor and paper to the positions of the fixed processing stations.

The input and output signals are represented in FIG. 1 by reference characters 101–115. Taken in order, these characters idenfity controls for diverter and feeder lift solenoids 101 and 102, sheet feeders 103 and 104, the illuminator and scanning motor 105 and 106, the sensitizing charger 107, the developer 108, the transfer and detacking coronas 109, the erasing and cleaning devices 110, the copy sheet feeders and diverters 111–114, and the fuser 115. Further description of a suitable control device is presented in previously referenced U.S. Pat. No. 3,914,047, which hereby is incorporated by reference into the present application.

Under the influence of the logic and control unit, the presentation to the process section of the original and process sheets, and their inversion, is coordinated so that the copies will be collated in the same page-sequential order as the original. For each circulation of an original sheet, an exposure is made to establish a visible representation of one face of that sheet, and for each visible representation that is established, a copy support is presented to receive it. Thus, the original and copy sheets are fed on a one-for-one basis. This is not to say that there is an equal number of original and copy sheets, which would not be the case when multiple copies are generated, but rather that there is one-for-one correspondence in the feeding of the respective sheets. Nor is it intended to imply that the original and corresponding copy sheets are fed at the same time. Generally the feeding of an original sheet is displaced in time from the feeding of its corresponding copy sheet either forward or backward depending upon the machine configuration.

The logic and control unit also tracks the copies as they are made, so that it can direct the document feeder to invert the original, and switch copy hoppers, at the appropriate times. In practice this can be accomplished by relatively simple procedures for counting and then shifting the diverters 76 and 48 and solenoid 78 in the appropriate sequence so that the first and second faces of the copies will properly correspond with the first and second faces of the original.

Offset stacking, stapling and other finishing operations have not been depicted. It is intended, however, that such apparatus be controlled for operation in synchronism with the copier, preferably by the logic and control unit 9.

From the foregoing it should be apparent that the structure of the present invention provides significant advantages not heretofore available from the teaching of the prior art. Duplex copies can be generated fully automatically and the copies will be collated as delivered without a sorter. The structure is relative simple, requires minimum alterations for implementation with presently available office copiers of the duplex type, and can be made reliable in operation. The originals are loaded in a natural manner, i.e. face-up, and the copies are delivered in the same manner. Moreover, the delivery of the copies is especially suitable for finishing operations such as stapling or off-set stacking. Generally speaking, the convenience of the copier is extended by the present invention to the copy finishing operations, because the copies can be stapled and stacked as delivered from the copier without an intervening sorter.

It should be understood that the present description and claims contemplate modes of operation that will account for the usual variations in originals. A duplex original that ends on the first face of the last sheet, for example, need not be copied on the blank face. In a similar respect, it should be recognized that all of the capabilities that are available in accordance with the present invention need not be used in every mode. Thus, the document feeder can have a non-collating mode and a simplex mode in addition to its collating duplex mode of operation.

Although the invention has been described in detail with particular reference to preferred embodiments thereof it will be readily understood that variations and modifications can be effected within the spirit and scope of the invention as described hereinabove and as defined in the appended claims.

I claim:

1. A copier for producing copies of an original having a page sequential order, the original and the copies including a plurality of flat sheets defining first and second faces, said copier comprising:

means for establishing representations of the original sheets and for transferring the representations to the copy sheets;

means for sequentially presenting and representing the original sheets to said establishing means, one presentation of an original sheet for each establishment of a representation, said presenting means including inverting means for turning over the original sheets to present and represent both the first and second faces thereof for copying;

means for sequentially feeding the copy sheets to said establishing means, one feeding of a copy sheet for each presentation of an original sheet, said feeding means including inverting means for turning over the copy sheets to receive the representations on both the first and second faces thereof; and means for controlling said establishing means, said presenting means and said feeding means to produce collated duplex copies having the page sequential order of the original.

2. A convenience copier for producing copies from a multi-page, duplex original, the original including flat supports having pages in sequential order on first and second faces thereof, the copies including flat supports having first and second faces, said copier comprising:

imaging means for establishing representations of the original pages;

original handling means for sequentially circulating and recirculating the original supports to said imaging means, one circulation of an original support for each establishment of a representation, said original handling means including a support inverter for turning over the original supports to present and represent both the first and second faces thereof for copying;

copy handling means for sequentially feeding copy supports to said imaging means, one feeding of a copy support for each circulation of an original support, to receive the representations from said imaging means, said copy handling means including a support inverter for turning over the copy supports to receive the representations on both the first and second faces thereof; and means for controlling said establishing means, said original handling means and said copy handling means to produce collated duplex copies with the pages in the sequential order of the original.

3. A copier for generating copies from a multi-page document having a page order, the document and the copies including a plurality of support mediums respectively defining first and second opposite faces, said copier comprising:

means for establishing visible representations of the document pages and for transferring the representations to the copy support mediums, said visible representations comprising image-wise distributions of marking particles;

a collating document feeder including means for presenting and representing the original support mediums to said establishing means, said feeder including an inverter for turning over the original support mediums to present and represent the first and second faces thereof for copying;

a duplexing copy feeder including means for transporting copy support mediums to said establishing means to receive the representations transferred from said establishing means said transporting means including an inverter for turning over the copy support mediums to receive the representations on both the first and second faces thereof; and means for controlling said establishing means, said collating document feeder and said duplexing copy feeder to present for copying all of the second document faces and then all of the first document faces and thereby to produce collated duplex copies with the pages of the copies in the page order of the original.

4. A convenience copier for making copies of originals, the originals and copies including a plurality of image supporting sheets having first and second faces, said copier comprising:

means for establishing representations of the originals;

means for feeding the original and copy sheets to said establishing means on a one-original-sheet one-copy-sheet basis, to present and represent the original sheets for copying and the copy sheets for receiving the representations; and means for inverting the original and copy sheets to present and represent both faces of the original sheets for copying and to present both faces of the copy sheets for receiving the representations.

5. A convenience copier for producing multiple copies of an original, the original and the copies each respectively comprising multiple sheets of support material having top and bottom sides representing in sequential order odd and even pages; said copier comprising:

means for producing representations of the original pages an an establishing rate and for transferring the representations to copy sheets at said established rate;

means for circulating and recirculating the original sheets to said producing means, all of the even pages first and then all of the odd pages, said last-mentioned means circulating and recirculating the originals one-after-another at said established rate; and means for feeding copy sheets to said transferring means one-after-another at said established rate to receive the representations, all of the even pages first and then all of the odd pages, each copy in correspondence with the odd and even pages of the original.

6. A copier for producing multiple copies of a master, the master and copies comprising supports having substantially flat first and second faces, said copier comprising:

means for establishing representations of the original pages and for transferring the representations to the copy supports;

means for circulating the original supports and for presenting the original supports to said establishing means all of the second faces of the original supports first and then all of the first faces of the original supports, said circulating means circulating and presenting each respective original once for each establishment of a representation; and means for feeding copy supports to said establishing means to receive the representations, all of the second faces of the copy supports first and then all of the first faces of the copy supports with the representations received on the first and second faces of the copy supports in proper correspondence with the first and second faces of the original.

7. A convenience copier for copying multi-page masters, the masters and copies including a pluarity of support sheets having first and second sides, said copier comprising:

electrophotographic processing means for establishing image-wise distributions of marking particles and for transferring the distributions to copy support sheets, said processing means including a photoconductor, a corona-charger for sensitizing the photoconductor, an imaging device for exposing the photoconductor to form a latent image therein, a developing device for applying marking particles to the latent image and transfer means for transferring the marking particles from said photoconductor to the copy support sheets;

collating means for presenting the masters to said processing means, said collating means including first and second hoppers for receiving the master sheets in a stack, means for circulating the master sheets one-after-another, and once for each exposure, from said second hopper to the exposure platen for copying and back to said second hopper, said circulating means maintaining the sequence of the master in said second hopper after each circulation of the matters, and means for circulating the master sheets one-after-another from said second hopper to said first hopper and back to said second hopper, said last-mentioned means including a stacker-refeeder for inverting the master sheets returned to said second hopper; and duplexing means for presenting the copy sheets to said processing means, said copy sheet presenting means including first, second and third hoppers, means for circulating the copy sheets one-after-another from said first hopper to said transfer means and then to said second hopper, means for feeding the copy sheets one-after-another from said second hopper to said transfer means and then to said third hopper, and means for inverting the copy sheets between said first and third hoppers.

8. A collating document feeder for sequentially presenting the respective pages of a multi-page document to a convenience copier, the document having a plurality of sheets defining first and second opposing faces, the copier including means for generating duplex copies on a flat support having first and second opposite faces; said feeder comprising:

a document supply including means for receiving and supporting the document sheets with the pages in an original order;

means for circulating and recirculating the respective sheets seriatim, removing the sheets one-after-another from said supply, presenting the removed sheets for copying and returning the copied sheets to said supply with the pages in the original order;

means for inverting the document sheets to present the first and second faces of the sheets for copying during circulation and recirculation of the sheets; and means coordinating said circulating and recirculating means and said inverting means for producing collated duplex copies having pages corresponding in order to the original order of the multi-page document.

9. A feeder for presenting an original to a convenience copier, the original having a plurality of sheets one on top of another, each respective sheet defining odd and even pages with all of the odd pages facing in one direction and all of the even pages facing in an opposite direction; said feeder comprising:

a hopper for receiving and supporting the original sheets, said hopper defining a top and a bottom;

means for circulating the original, one sheet after another, removing the respective sheets from the bottom of said hopper, presenting the removed sheets for copying and returning the copied sheets to the top of said hopper, said circulating means circulating the original twice for each respective copy;

means for inverting the original sheets to present the odd and even pages of the sheets for copying; and means for coordinating the operation of said circulating means and said inverting means to present all of the even pages of the original for copying during one circulation of the original and all of the odd pages of the original for copying during a different circulation of the original.

10. A feeder for automatically presenting the respective pages of a multi-page duplex original to a convenience copier, the original having a plurality of sheets defining first and second faces, the copier including an exposure platen; said feeder comprising:

a hopper including a supporting tray for receiving the original sheets with the pages in an original order;

circulating means for sequentially presenting the sheets to the platen, said circulating means including sheet guiding structure defining a first generally U-shaped path leading from said hopper to a position remote from said hopper and back to said hopper, and propelling means for sequentially removing respective sheets from said hopper, transporting the sheets along said path and returning the sheets to said hopper in the original order;

a sheet inverter including means for removing the sheets from said hopper, inverting the sheets, and returning the inverted sheets to said hopper; and means coordinating said circulating means and said sheet inverter for producing duplex collated copies having pages corresponding in order to the multi-page original.

11. A collating feeder for presenting the pages of a multi-page original to a convenience copier, the original having a plurality of sheets defining odd and even pages on opposite faces thereof; said feeder comprising:

a hopper including a tray for supporting the original sheets in a stack with the pages in an original order, said hopper including a top, a bottom and sides defining a volume for receiving the stack therewithin, and means defining an exit and an entrance both respectively configured to pass individual sheets on opposite sides of said volume, with said entrance adjacent the top and said exit adjacent the bottom of said volume;

a sheet circulator defining a first path from said exit to a position removed from said tray and then to said entrance, said path in said removed position defining a flat section for presenting the sheets to the copier, and propelling means for sequentially removing respective sheets from said hopper, transporting the removed sheets along said path to said removed section and returning the transported sheets to said hopper in the original order;

a sheet inverter including a sheet stacker-refeeder and means defining a second path from said exit to said stacker-refeeder and then to said entrance to invert the sheets in said hopper; and means coordinating said sheet circulator and said sheet inverter for presenting first the even and then the odd pages of the original sheets to the copier.

12. A document feeder for presenting the pages of a multi-page document to an exposure platen of a convenience copier, the document having a plurality of supports bearing images on opposite faces of the supports, the copier including means for exposing the images through the exposure platen to produce copies, said feeder comprising:

first and second hoppers for receiving the document supports in a stack;

means for circulating the document supports one-after-another, from said second hopper to the exposure platen and back to said second hopper, each support circulating once for each exposure, said circulating means maintaining the page-wise sequence of the document in said second hopper after each circulation of the document; and means for circulating the document supports one-after-another from said second hopper to said first hopper and back to said second hooper, said last-mentioned means including a stacker-refeeder for inverting the document supports returned to said second hopper.

13. A feeder for presenting the pages of a multi-page original to an exposure platen of a convenience copier, the original having a plurality of sheets successively defining odd and even pages, respectively, on opposite sides thereof, said feeder comprising:

first and second hoppers, each hopper respectively including means for supporting the original sheets in a stack defining a top and a bottom, said second hopper including means for receiving the sheets one-at-a-time at the top and for feeding the sheets one-at-a-time from the bottom of the stack in the second hopper, said first hopper including means for receiving the sheets one-at-a-time at the top and for feeding the sheets one-at-a-time from the top of the stack in the first hopper;

means for circulating the original sheets one-after-another from the bottom of the stack in said second hopper to the exposure platen for copying and back to the top to the stack in said second hopper, said circulating means maintaining the page-wise sequence of the original in said second hopper after each circulation of the original;

means for circulating the original sheets one-after-another from the bottom of the stack in said second hopper to the top of the stack in said first hopper and then from the top of the stack in said first hopper to the top of the stack in said second hopper, said means inverting the sheets by said last-mentioned circulation; and means coordinating both-mentioned circulating means for presenting all of the even pages first and then all of the odd pages to the exposure platen for copying.

14. A feeder for presenting the pages of a multi-page original to an exposure platen for copying, the original including sheets of flat support material defining odd and even pages, respectively, on opposite faces of the support material, said feeder comprising:

a first hopper for receiving and supporting the original sheets in a stack;

a second hopper for receiving and supporting the original sheets in a stack;

means for feeding the respective sheets of support material one-after-another from the top of the stack in said first hopper to said second hopper, each respective sheet on top of the previously fed sheet, said feeding means turning the sheets over between said first and second hoppers;

means for circulating the respective sheets one-after-another from the bottom of the stack in said second hopper, to the exposure platen, and back to the top of the stack in said second hopper; and means for feeding the respective sheets one-after-another from the bottom of the stack in said second hopper to said first hopper, each respective sheet on top of the previously fed sheet, and then from the top of the stack in said first hopper to said second hopper, each respective sheet on top of the previously fed sheet, said last-mentioned feeding means turning the sheets over between the bottom of the stack in said second hopper and the top of the stack in said second hopper to invert the sheets in said second hopper.

* * * * *